Figure 1:
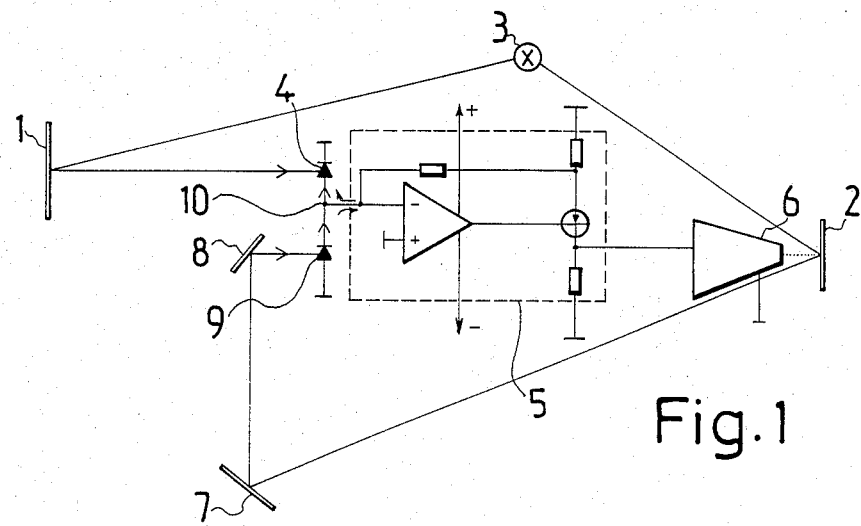

United States Patent [19]

Kirjavainen et al.

[11] Patent Number: 4,538,173
[45] Date of Patent: Aug. 27, 1985

[54] IMPRINT CONTROL SYSTEM WITH FEEDBACK FEATURE

[76] Inventors: Kari Kirjavainen, Kristianinkatu 7 C 38, 00170 Helsinki 17; Asko S. Riekkinen, Sepontie 1 E, 02130 Espoo 13, both of Finland

[21] Appl. No.: 455,471

[22] Filed: Jan. 4, 1983

[30] Foreign Application Priority Data

Jan. 4, 1982 [FI] Finland ................................. 820009

[51] Int. Cl.³ .............................................. H04N 1/46
[52] U.S. Cl. ......................................... 358/75; 346/75; 358/293; 358/294; 358/296
[58] Field of Search ...................... 358/77, 80; 346/75; 358/75, 293, 294, 296

[56] References Cited

U.S. PATENT DOCUMENTS

| | | | |
|---|---|---|---|
| 3,488,434 | 1/1970 | Farber | 358/80 |
| 3,553,371 | 1/1971 | Suenaga | 358/77 |
| 3,578,897 | 5/1971 | Stock | 358/77 |
| 4,183,030 | 1/1980 | Kaieda | 346/75 |

Primary Examiner—Howard W. Britton
Attorney, Agent, or Firm—Pahl, Lorusso & Loud

[57] ABSTRACT

A procedure for controlling the imprint in reproductive printing. With a view to providing a versatile printing control system, and one which eliminates the maximum of errors, the invention is mainly characterized in that by means of an optical system is formed an image signal consistent with the imprint and which is compared with a set-point image signal produced in one way or another, from the result of comparison thus obtained being formed an electrical differential signal, which according to the feedback principle controls the formation of the imprint of each object under examination.

12 Claims, 3 Drawing Figures

IMPRINT CONTROL SYSTEM WITH FEEDBACK FEATURE

The present invention concerns a procedure for controlling the imprint in reproductive printing.

Reproductive, or copying, printing is employed in numerous applications of printing technology, for instance in copying, in computer-controlled picture making, in printing on paper or textile material and in the producing of hybrid and printed circuits. Since accurate measurement of the original's colours and hues is a nearly impossible task, the major part of the errors in printed products consist of inaccuracies of measurement. Another significant source of error is the control system interpreting the result of measurement: the signal produced by this system from a given picture element may be dependent e.g. on the pick-up that is used or on the non-linearity of response; on the printing apparatus itself: this too may not react with absolute linearity to the signal supplied by the control system, or it may otherwise produce an imprint of varying quality for various reasons. Matters are furthermore influenced by variations in the colour ink, e.g. variations between shipments and variations caused by different temperatures.

It is owing to these facts that imprint controlling methods of prior art, wherein direct measurement of the object if employed, are within reasonable price only applicable in limited uses, such as in printers or in the making of coarse screen images.

The object of the present invention is a new type of imprint controlling system wherein the drawbacks mentioned above have been eliminated and which is based on the feedback principle, commonly known in itself. The invention is mainly characterized in that by means of an optical system an image signal corresponding to the imprint is formed and this is compared with a set-point image signal formed in one way or another, from the result of comparison that is obtained being formed an electrical differential signal, and which in accordance with the feedback principle controls the forming of each imprint of the object under examination. Thereby the variations occurring in the printing press (or machine) and in the colour ink have no effect on the end result because they are corrected by the feedback action. The variations introduced by variations of the base material and of the tracing speed are likewise corrected, as well as any changes arising from wear and abrasion.

An advantageous embodiment of the invention is characterized in that the set-point image signal with which the image signal is compared has been formed from the object that is being depicted, by a system similar to that by which the imprint image signal is produced. By a control implemented in this way an exact copy is simply achieved, because the measurements are most sensibly performed with identical pick-ups and signal forming circuits, whereby the copy will, thanks to the continuous measurement, be automatically controlled to reproduce the original picture.

An advantageous embodiment of the invention is characterized in that the scale of the printed product is changeable by changing the optical system. This is well-known technology in itself.

An advantageous embodiment of the invention is also characterized in that the colour proportions and contrasts in the printed product can be regulated by adjusting the apertures of a stop provided in the optics. By this extra feature faults etc. present in the original may be corrected.

An advantageous embodiment of the invention is also characterized in that the picture elements formed by the aid of the optical system are both projected onto at least one light-sensitive electrical component, such as a photodiode, thr signals delivered by these components and corresponding to the brightness of the image being mutually compared.

An advantageous embodiment of the invention is furthermore characterized in that light-sensitive components, such as photodiodes for instance, have been disposed in rows so that for each picture element to be examined there is at least one pair of said components over the entire stretch of the printing width, on one of these components being focused the image of the imprint of a picture element and on the other, the equivalent image from the object. It becomes impossible hereby to proceed with the printing of the picture over its entire width simultaneously.

Another advantageous embodiment of the invention is characterized in that the pairs composed of light-sensitive electrical components are three in number: one for each primary colour (cyan, magenta and yellow). To produce full colour pictures, one needs three systems of the kind mentioned which may operate simultaneously or in succession, each controlling the contribution of one primary colour to the picture. The optical system may be either individual for each primary colour or preferably common, in which case only the control electronics is individual.

An advantageous embodiment of the invention is further characterized in that the optical system comprises a lighting means, the light from this being used to produce both images that have to be formed, simultaneously with the aid of two substantially identical branches of the optical system. This disposition reduces even further the chance of errors to appear because the result of measurement both of the object that is being copied and of the picture that is produced is similarly distorted, as regards intensity fluctuations of the measuring light, reproduction of hues, etc.

A third advantageous embodiment of the invention is characterized in that the optical system and the electronics associated therewith, needed to produce electrical signals proportional to the brightness of the picture element, have been divided into two separate parts, one of them comprising the image-forming from the object and a transmitter means for the image signal formed, utilizing any data transfer method previously known in itself, and the other comprising the image-forming from the imprint and a image signal receiver means utilizing any data transfer method previously known in itself, and signal comparison means and imprint control logics operating on the feedback principle. One is compelled, in this embodiment, to give up some of the advantages of the embodiment described in the preceding paragraph, but one gains on the other hand an appreciable improvement, with the feedback, for instance in comparison with existing telecopying apparatus.

Another advantageous embodiment of the invention is characterized in that the optical system is employed in the control of a printing machine based on the jetting of a liquid substance. It is to advantage to apply the procedure of the invention on printing machines where the imprint is controlled directly by electrical control, e.g. by varying the strength of magnetic fields.

An advantageous embodiment of the invention is further characterized in that the measuring of the imprint using an optical system and image forming is made from the base material that is printed on. This is a simple solution which implies no technical complicated design solutions.

Another advantageous embodiment of the invention is characterized in that the measurement of the imprint using an optical system and image forming is made through the printing liquid jet. This procedure results in faster feedback.

The invention is described in the following with the aid of an example, with reference to the attached drawings, wherein FIG. 1 presents a simple imprint control system applying a procedure according to the invention, in the form of a schematic diagram.

Figure 2:
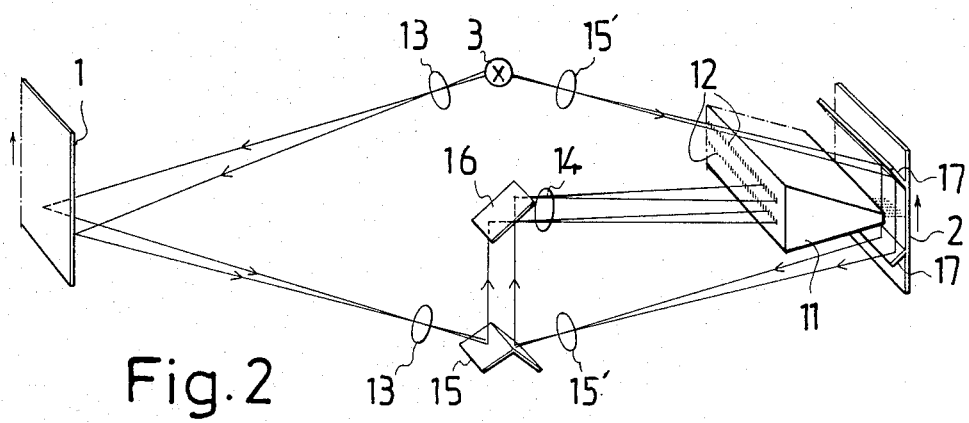

FIG. 2 presents the procedure of the invention, applied to the printing liquid jetting head of a printing machine operating according to the so-called ink jet principle.

Figure 3:
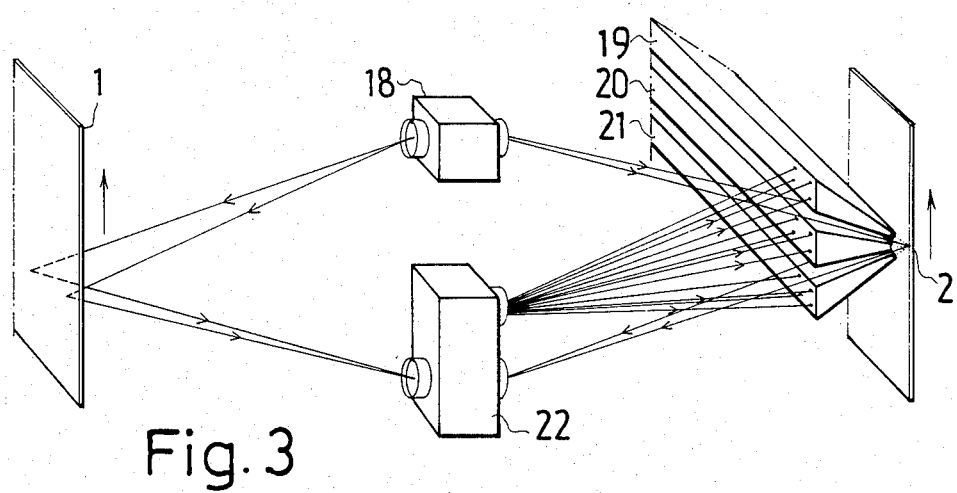

FIG. 3 presents the procedure of the invention, applied in a three-colour printing machine based on the principle of the preceding figure.

For producing picture elements, the system according to the invention has been divided into channels, one of which has been depicted in FIG. 1, and wherein the object to be reproduced, 1, and the traced image 2 are illuminated by the same light source 3. The light reflected by the object 1 is measured with a photodiode 4 and amplified by a control amplifier 5, which controls the tracing head 6 so that on the tracing location 2 is jetted an appropriate quantity of printing liquid. The tracing head 6 may be any kind of member based on printing liquid jetting of which the operation can be controlled from the outside with the aid of electrical signals. In order that the number of particles detached from the tracing head 6 might correspond to the amount of colour at the equivalent picture element of the object 1, the light transmitted by the particles is optically measured through the mirrors 7 and 8 by the photodiode 9, the amount of flowing particles being made consistent with the amount of colour of the object 1 by comparison of the photocurrents, opposite of their sign, from the diodes 4 and 9 at the point 10 and by keeping up by means of the amplifier 5 the jetting of fluid to the tracing site 2 until the difference of the currents becomes zero.

In FIG. 2 has been presented a mode of implementing the apparatus of FIG. 1, wherein the electronic circuitry has been integrated in the tracing head 11. The photodiodes 4 and 9 can be distinguished as lines of points, 12. On the diodes is projected a band-shaped picture element, which is thus understood to cover a plurality of diodes at the same time; on the lower row 12 is produced a picture element formed from the object 1 to be copied, with the aid of lenses 13 and 14 and mirrors 15 and 16 and on the upper row, the light quantity passed through the printing liquid jet and therefore proportional to the imprint, obtained with the aid of lenses 15' and 14 and mirrors 17, 15 and 16. Optical systems may be provided in any suitable number to cover the whole printing width; the individual electronic control system of each picture element takes care in any case of the correct imprint for that picture element. When printing with several colours, one system per colour is required, and the systems may then operate simultaneously, consecutively producing each its own trace on the paper passing by. The light is before its arrival at the photodiodes conducted through colour filters to produce the desired colour components.

FIG. 3 depicts another embodiment of the invention for producing a full colour picture, wherein the joint lighting unit 18 illuminates both the object 1 and the the imprint 2 and wherein the picture is separately formed for three primary colours in an optical three-colour system 22, which transmits the two images to be compared, of each primary colour, to each primary colour's tracing head 19, 20, 21, in these heads having been integrated their individual photodiode and control units in likeness with the preceding example.

It is obvious to a person skilled in the art that different embodiments of the invention are not confined merely to the examples presented and may instead vary within the scope of the claims stated below. For instance, the kind of the object to be copied is not restricted in any way whatsoever, nor is the base material to be printed on, as little as the printing machine or its principle of operation either.

We claim:

1. A process for controlling formation of an imprint having individual picture elements in reproductive printing by means of an optical system comprising the steps of:
   forming an imprint image signal corresponding to the imprint;
   forming a set-point image signal;
   comparing said imprint image signal with said set-point image signal;
   forming an electrical differential signal from the result of comparison thus obtained; and
   according to the feedback principle controlling the formation of the imprint of each object under examination.

2. The process according to claim 1, further comprising the steps of varying the optical system to vary the scale of said imprint.

3. The process according to claim 1, further comprising regulating the color proportions and contrasts in said imprint by the steps of:
   providing the optical system with an optical stop having apertures; and
   adjusting said apertures.

4. The process according to claim 1, wherein forming said imprint is achieved by utilizing the optical control system in controlling a printing machine based on the liquid substance jetting principle.

5. The process according to claim 4, wherein forming the imprint image signal using said optical system is accomplished by measurement from the base material printed upon.

6. The process according to claim 4, wherein forming the imprint image signal, using said optical system is accomplished by measurement through the printing liquid jet.

7. The process according to claim 1, wherein forming the set-point image signal with which the imprint image signal is compared is achieved by applying to the object that is being copied an optical system that can be used to form the imprint signal.

8. The process according to clam 7, wherein said optical system comprises a lighting means, and at least two substantially identical branches, and the light from said lighting means is used to produce both the imprint and set-point image signals simultaneously with the aid of said two substantially identical branches of the optical system.

9. The process according to claim 7 further comprising the steps of:
   providing a transmitter means, utilizing any data transfer method previously known for transmitting said set-point image signal;
   integrating said transmitter means with said means for forming said set-point image signal and said optical system associated with said set-point image signal;
   providing a receiver means, utilizing any data transfer method previously known for receiving said set-point image signal;
   providing imprint control logics based on the feedback principle; and
   integrating said receiver means with said means for forming said imprint image signal, said optical system associated with said imprint image signal, said means for forming said electrical differential signal and said imprint control logics.

10. The process according to claim 2 wherein the step of forming said imprint image signal comprises:
    reflecting and focusing an image of a picture element of said imprint onto at least one light sensitive electrical component, such as a photodiode;
    the step of forming said set-point image signal comprises:
    reflecting and focusing an image of an element of said object under examination onto at least one light sensitive component, such as a photodiode;
    and wherein said step of comparing said imprint image signal with said set-point image signal comprises electronically comparing the electrical signal produced by said light sensitive electrical components corresponding to said imprint image signal with the electrical signal produced by said light sensitive electrical components corresponding to said set-point image signal.

11. The process according to claim 10, further comprising the steps of:
    disposing said light-sensitive components, such as photodiodes, in rows so that for each picture element to be examined there is at least one pair of said light-sensitive components over the entire stretch of the printing width;
    focusing an image of the imprint of the picture element on one of said components;
    and focusing an image of the object corresponding to the picture element on the other component.

12. The process according to claim 11 further comprising the step of providing three pairs of light-sensitive electrical components; one for each primary color: cyan, magenta, and yellow.

* * * * *